(12) United States Patent
Kikuchi et al.

(10) Patent No.: US 12,290,884 B1
(45) Date of Patent: May 6, 2025

(54) SOLDER PASTE AND SOLDER JOINT

(71) Applicant: SENJU METAL INDUSTRY CO., LTD., Tokyo (JP)

(72) Inventors: Shinji Kikuchi, Tokyo (JP); Yoshie Tachibana, Tokyo (JP); Tomoki Sasaki, Tokyo (JP); Ayumi Mio, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 19/020,375

(22) Filed: Jan. 14, 2025

(30) Foreign Application Priority Data

Jan. 23, 2024 (JP) .................. 2024-008280

(51) Int. Cl.
*B23K 35/30* (2006.01)
*B23K 35/02* (2006.01)

(52) U.S. Cl.
CPC ........ *B23K 35/3033* (2013.01); *B23K 35/025* (2013.01)

(58) Field of Classification Search
CPC .................. B23K 35/3033; B23K 35/025
See application file for complete search history.

(56) References Cited

FOREIGN PATENT DOCUMENTS

| | | | |
|---|---|---|---|
| CN | 101041901 A | | 9/2007 |
| JP | 2012076097 A | * | 4/2012 |
| JP | 2012091223 A | | 5/2012 |
| JP | 2016083695 A | | 5/2016 |

OTHER PUBLICATIONS

Japanese Notice of Reasons for Rejection for Application No. 2024-008280, mailed Mar. 26, 2024 (8 pages).

* cited by examiner

*Primary Examiner* — Adil A. Siddiqui
(74) *Attorney, Agent, or Firm* — NIXON PEABODY LLP; Jeffrey L. Costellia

(57) ABSTRACT

A solder paste containing a first metal powder, a second metal powder, and a flux is employed. The first metal powder contains Sn. A second metal powder 20A has a core portion 201 formed of an alloy containing Ni and Fe, and a surface layer 202 that covers the core portion 201 and is formed of a metal containing Ni. An Ni content in the metal forming the surface layer 202 of the second metal powder 20A is 50% by mass or more relative to a total mass of the metal forming the surface layer 202 of the second metal powder 20A. The surface layer 202 of the second metal powder 20A has a thickness of 0.05 μm or more and 0.30 μm or less.

3 Claims, 7 Drawing Sheets

SOLDER PASTE AND SOLDER JOINT

BACKGROUND OF THE INVENTION

Field of the Invention

The present invention relates to a solder paste and a solder joint. Priority is claimed on Japanese Patent Application No. 2024-008280, filed on Jan. 23, 2024, the content of which is incorporated herein by reference.

Description of Related Art

In recent years, a solder joint portion reaches about 250° C. to 280° C. in some cases with an increase in temperature of an operating environment of a power semiconductor element using silicon carbide (SiC) or the like. Therefore, a high-temperature solder that does not melt during an operation under such a high-temperature condition is required.

In the production of the solder joint, various solder pastes are used as a soldering material. Examples of the solder paste include an Ag paste that is sinterable at a low temperature and a transient liquid phase (TLP, liquid phase diffusion) paste corresponding to the RoHS directive by the European Union.

The TLP paste is a paste containing a plurality of types of solder powders. In the TLP paste, the solder powders form a high-melting point compound during heating. As a result, even in a case where the solder joint is re-heated, it is possible to suppress remelting, so that it is possible to increase heat resistance. As such a TLP paste, for example, a paste in which Cu balls and Sn solder ball are dispersed through a flux is proposed (see Japanese Unexamined Patent Application, First Publication No. 2012-91223).

SUMMARY OF THE INVENTION

However, the solder paste containing a flux as described in Japanese Unexamined Patent Application, First Publication No. 2012-91223 has a problem in that the flux gasified during melting of the solder powder remains in the molten solder, and a large amount of voids are thus likely to occur during solidification. In particular, in the TLP paste in which a high-melting point compound is formed during solidification, the fluidity is reduced, and the gasified flux is unlikely to be released to the outside.

The present invention is contrived in view of the above-described circumstances, and an object of the present invention is to provide a solder paste that has excellent heat resistance and can further suppress the occurrence of voids during solder joining, and a solder joint formed using the solder paste.

The present invention includes the following aspects.

[1] A solder paste containing: a first metal powder; a second metal powder; and a flux, in which the first metal powder contains Sn, the second metal powder has a core portion formed of an alloy containing Ni and Fe, and a surface layer that covers the core portion and is formed of a metal containing Ni, an Sn content in the first metal powder is 20% by mass or more and 100% by mass or less relative to a total mass of the first metal powder, an Ni content in a metal forming the core portion of the second metal powder is 80% by mass or more and 99% by mass or less relative to a total mass of the metal forming the core portion of the second metal powder, an Fe content in the metal forming the core portion of the second metal powder is 1% by mass or more and 20% by mass or less relative to the total mass of the metal forming the core portion of the second metal powder, an Ni content in the metal forming the surface layer of the second metal powder is 50% by mass or more relative to a total mass of the metal forming the surface layer of the second metal powder, a particle diameter of the first metal powder is 0.1 to 1,000 μm, a particle diameter of the second metal powder is 0.2 to 1,000 μm, and the surface layer of the second metal powder has a thickness of 0.05 μm or more and 0.30 μm or less.

[2] The solder paste according to [1], in which a content of the first metal powder is 30% to 99% by mass relative to a total mass of the first metal powder and the second metal powder, and a content of the second metal powder is 1% to 70% by mass relative to the total mass of the first metal powder and the second metal powder.

[3] A solder joint formed using the solder paste according to [1] or [2].

According to the present invention, it is possible to provide a solder paste that has excellent heat resistance and can further suppress the occurrence of voids during solder joining.

DETAILED DESCRIPTION OF THE INVENTION

Figure 1:
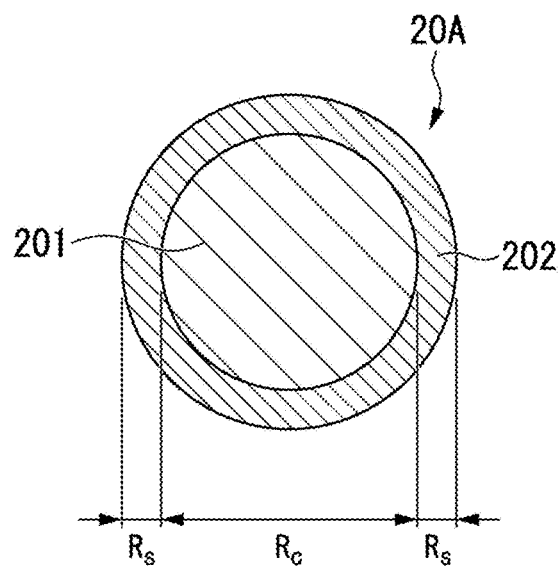
FIG. 1 is a schematic diagram showing a cross section of a second metal powder 20A of a solder paste in a first embodiment.

In the present specification, the terms "include" and "contain" each have a concept including all of "comprise", "consist essentially of", and "consist of".

In the present specification, the term "first metal" may mean "particles formed of a first metal", the term "second metal" may mean "particles formed of a second metal", and the term "third metal" may mean "particles formed of a third metal".

In the present specification, the term "first metal powder" may mean a "particle group formed of a first metal", the term "second metal powder" may mean a "particle group formed of a second metal", and the term "third metal powder" may mean a "particle group formed of a third metal".

Solder Paste First Embodiment

A solder paste according to a first embodiment contains a first metal powder, a second metal powder, and a flux.

The first metal powder contains Sn.

The second metal powder has a core portion formed of an alloy containing Ni and Fe, and a surface layer containing Ni that covers the core portion.

<First Metal Powder>

The metal (hereinafter, referred to as a first metal) constituting the first metal powder is a metal containing Sn. The first metal may contain a metal other than Sn.

Examples of the metal other than Sn, that may be contained in the first metal, include Ag, Cu, In, Bi, Ni, Ge, P, Co, Ga, Zn, Sb, Pb, Au, Al, Pt, Pd, Fe, Mn, Zr, and As. These metals other than Sn may be contained alone, or two or more thereof may be contained. A metal group other than Sn can be optionally selected from these metals.

The metal that may be contained in the first metal may be a simple substance of each of Sn and a metal other than Sn, or may be a material obtained by alloying Sn and a simple substance of a metal other than Sn.

For example, the first metal may be an Sn simple substance, a material obtained by mixing a metal other than Sn and Sn, a material obtained by alloying a metal other than Sn and Sn, or a material obtained by mixing an alloy containing Sn and a metal other than the alloy.

The first metal may contain unavoidable impurities other than the above-described metals. Even in a case where unavoidable impurities are contained, the effects of the present invention are not affected.

A single type of the first metal or two or more types of the first metals may be used.

In the present specification, the phrase "a melting point of a metal to be measured, or a melting point of a metal powder to be measured" refers to a melting point measured by differential scanning calorimetry (DSC). The melting point of the metal to be measured means the temperature at which the amount of heat absorbed per unit time is the highest, based on the results of DSC measurement of the metal to be measured. When the metal to be measured has one peak in DSC measurement, the melting point of the metal to be measured means the temperature at the top of that peak. When the metal to be measured has multiple peaks in DSC measurement, the melting point of the metal to be measured means the temperature of the peak top that has the highest amount of heat absorbed per unit time, among the multiple peak tops. In other words, when the metal to be measured contains multiple types of metals, the temperature of the peak top that has the highest amount of heat absorbed per unit time, among the multiple peak tops that the metal to be measured may have, is used as the melting point of the metal to be measured.

The melting point of the first metal can be measured using, for example, DSC7020 manufactured by Hitachi High-Tech Science Corporation. The melting point of the second metal to be described later can be measured using, for example, DSC404-F3Pegasus manufactured by NETZSCH.

The melting point of the first metal is preferably 300° C. or lower, and may be 250° C. or lower, or 80° C. to 200° C.

In a case where the melting point of the first metal is equal to or lower than the upper limit of the above-described preferred range, the solder's wettability is easily ensured.

The Sn content in the first metal is 20% by mass or more and 100% by mass or less relative to the total mass of the first metal. In order for the characteristics of Sn to be sufficiently exhibited, the Sn content in the first metal is preferably 90% by mass or more, more preferably 95% by mass or more, and still more preferably 100% by mass relative to the total mass of the first metal.

In the present specification, the phrase "a particle diameter of a metal or a particle diameter of a metal powder" refers to an average particle diameter measured on a volume basis using a laser diffraction/scattering type particle size distribution measurement device.

The average particle diameter can be measured using, for example, a laser diffraction/scattering type particle size distribution measurement device (MT3300EXII) manufactured by MicrotracBEL Corp.

The particle diameter of the first metal powder is 0.1 to 1,000 µm, and preferably 1 to 100 µm.

In a case where the particle diameter of the first metal powder is equal to or more than the lower limit of the above-described preferred range, the wettability is easily ensured. In a case where the particle diameter of the first metal powder is equal to or less than the upper limit of the above-described preferred range, an intermetallic compound is more easily formed.

<Second Metal Powder>

As illustrated in FIG. 1, a second metal powder 20A has a core portion 201 and a surface layer 202 that covers the whole core portion 201.

Rc represents a core diameter of the core portion 201.
Rs represents a thickness of the surface layer 202.

The metal forming the core portion 201 is formed of an alloy containing Ni and Fe.

The metal forming the surface layer 202 is formed of a metal containing Ni.

<<Surface Layer>>

The metal forming the surface layer of the second metal powder may consist of Ni, or may be a metal containing Ni and a metal other than Ni.

The metal containing Ni and a metal other than Ni may be a material obtained by alloying a metal other than Ni and Ni.

The metal forming the surface layer is preferably an Ni simple substance.

Examples of the metal other than Ni, that may be contained in the metal forming the surface layer, include Ag, Cu, In, Bi, Ge, P, Co, Ga, Zn, Sb, Pb, Au, Al, Pt, Pd, Fe, Mn, Zr, Sn, and As. These metals other than Ni may be contained alone, or two or more thereof may be contained. A metal group other than Ni can be optionally selected from these metals.

The metal forming the surface layer may contain unavoidable impurities other than the above-described metals. Even in a case where unavoidable impurities are contained, the effects of the present invention are not affected.

In a case where the metal forming the surface layer is a metal containing Ni and a metal other than Ni, the Ni content in the metal forming the surface layer is 50% by mass or more and less than 100% by mass, preferably 70% by mass or more, more preferably 80% by mass or more, still more preferably 90% by mass or more, particularly preferably 95% by mass or more, and most preferably 98% by mass or more, relative to the total mass of the metal forming the surface layer.

In a case where the metal forming the surface layer contains Fe, the Fe content in the metal forming the surface layer is preferably 0% by mass or more and less than 5% by mass relative to the total mass of the metal forming the surface layer.

A thickness Rs of the surface layer is 0.05 µm or more and less than 1.20 µm.

The thickness Rs of the surface layer is preferably 0.05 µm, 0.10 µm, 0.15 µm, 0.20 µm, 0.25 µm, 0.30 µm, 0.35 µm, 0.40 µm, 0.45 µm, 0.50 µm, 0.55 µm, 0.60 µm, 0.70 µm, 0.75

μm, 0.80 μm, 0.90 μm, 1.00 μm, 1.10 μm, or 1.15 μm, and the upper and lower limits can be appropriately selected from these values.

The thickness Rs of the surface layer may be 0.10 μm or more and less than 1.20 μm, 0.15 μm or more and less than 1.20 μm, 0.20 μm or more and less than 1.20 μm, 0.25 μm or more and less than 1.20 μm, 0.30 μm or more and less than 1.20 μm, 0.35 μm or more and less than 1.20 μm, 0.40 μm or more and less than 1.20 μm, 0.45 μm or more and less than 1.20 μm, 0.50 μm or more and less than 1.20 μm, 0.55 μm or more and less than 1.20 μm, 0.60 μm or more and less than 1.20 μm, 0.70 μm or more and less than 1.20 μm, 0.75 μm or more and less than 1.20 μm, 0.80 μm or more and less than 1.20 μm, 0.90 μm or more and less than 1.20 μm, 1.00 μm or more and less than 1.20 μm, 1.10 μm or more and less than 1.20 μm, or 1.15 μm or more and less than 1.20 μm.

The thickness Rs of the surface layer may be 0.05 μm or more and 1.15 μm or less, 0.05 μm or more and 1.10 μm or less, 0.05 μm or more and 1.00 μm or less, 0.05 μm or more and 0.90 μm or less, 0.05 μm or more and 0.80 μm or less, 0.05 μm or more and 0.75 μm or less, 0.05 μm or more and 0.70 μm or less, 0.05 μm or more and 0.60 μm or less, 0.05 μm or more and 0.55 μm or less, 0.05 μm or more and 0.50 μm or less, 0.05 μm or more and 0.45 μm or less, 0.05 μm or more and 0.40 μm or less, 0.05 μm or more and 0.35 μm or less, 0.05 μm or more and 0.30 μm or less, 0.05 μm or more and 0.25 μm or less, 0.05 μm or more and 0.20 μm or less, 0.05 μm or more and 0.15 μm or less, or 0.05 μm or more and 0.10 μm or less.

From the viewpoint of obtaining sufficient heat resistance and further increasing the void-suppressing ability, the thickness Rs of the surface layer is preferably 0.10 μm or more and less than 1.20 μm.

From the viewpoint of obtaining sufficient void-suppressing ability and further increasing the heat resistance, the thickness Rs of the surface layer is preferably 0.05 μm or more and 1.0 μm or less, more preferably 0.05 μm or more and 0.75 μm or less, still more preferably 0.05 μm or more and 0.30 μm or less, particularly preferably 0.05 μm or more and 0.25 μm or less, most preferably 0.05 μm or more and 0.20 μm or less, and may be 0.05 μm or more and 0.15 μm or less or 0.05 μm or more and 0.10 μm or less.

In a case where the thickness Rs of the surface layer is equal to or more than the lower limit, it is possible to further increase the void-suppressing ability. In a case where the thickness Rs of the surface layer is equal to or less than the upper limit, it is possible to further increase the heat resistance.

In the present specification, the thickness Rs of the surface layer of the second metal powder, the core diameter Rc of the core portion, and a thickness Ri of an intermediate layer of the second metal powder in a second embodiment and a thickness Rm of a metal layer of the second metal powder in a third embodiment, which will be described later, can be measured from a cross-sectional structure of the second metal powder using an optical microscope, a SEM, a transmission electron microscope (TEM), or the like.

Otherwise, the thickness Rs of the surface layer of the second metal can be measured using an Auger electron spectroscopy analyzer based on Auger electron spectroscopy.

Otherwise, the core diameter Rc of the core portion of the second metal powder can be measured as follows. In the production of the second metal powder, a particle diameter of the metal powder prepared for use as the core portion can be set as the core diameter Rc.

The melting point of the metal forming the surface layer is preferably higher than 300° C., more preferably 500° C. or higher, and still more preferably 600° C. to 1,600° C.

The surface layer may be a plating layer formed by plating.

Examples of the method for plating include known electroplating and electroless plating.

At least a part of a surface of the core portion is covered with the surface layer. In FIG. 1, the whole surface of the core portion is covered with the surface layer.

The proportion of the area of the surface of the core portion covered with the surface layer is preferably 50% or more and 100% or less, more preferably 70% or more and 100% or less, still more preferably 90% or more and 100% or less, particularly preferably 95% or more and 100% or less, and most preferably 100%, relative to the total surface area (100%) of the core portion.

<<Core Portion>>

The core portion of the second metal powder is formed of an alloy containing Ni and Fe.

The alloy of the core portion contains Ni and Fe, and has a higher melting point than the first metal powder.

The melting point of the alloy of the core portion is preferably higher than 300° C., more preferably 500° C. or higher, and still more preferably 600° C. to 1,600° C.

In a case where the melting point of the alloy of the core portion is higher than the lower limit of the above-described preferred range, the heat resistance can be increased, and the shear strength of a solder joint is easily increased.

The alloy of the core portion may contain a metal other than Ni and Fe. That is, the second metal may be an alloy of Ni and Fe, or an alloy of Ni, Fe, and a metal other than Ni and Fe. Among them, an alloy of Ni and Fe is preferable.

Examples of the metal other than Ni and Fe, that may be contained in the alloy of the core portion, include Ag, Cu, In, Bi, Ge, P, Co, Ga, Zn, Sb, Pb, Au, Al, Pt, Pd, Mn, Zr, Sn, and As. These metals other than Ni and Fe may be contained alone, or two or more thereof may be contained. A metal group other than Ni and Fe can be optionally selected from these metals.

The metal forming the core portion may contain unavoidable impurities other than the above-described metals. Even in a case where unavoidable impurities are contained, the effects of the present invention are not affected. A single type of the second metal or two or more types of the second metals may be used.

The Ni content in the metal forming the core portion is 80% by mass or more and 99% by mass or less, and preferably 85% by mass or more and 95% by mass or less relative to the total mass of the metal forming the core portion.

The Fe content in the metal forming the core portion is 1% by mass or more and 20% by mass or less, and preferably 5% by mass or more and 15% by mass or less relative to the total mass of the metal forming the core portion.

In a case where the Ni content and the Fe content in the metal forming the core portion are in the above-described preferred ranges, an intermetallic compound is formed at an earlier stage, and the heat resistance can be improved.

The core diameter Rc of the core portion 201 of the second metal powder 20A is preferably 0.1 to 1,000 μm, more preferably 3 to 300 μm, still more preferably 5 to 100 μm, and particularly preferably 10 to 50 μm.

In the second metal powder 20A, the ratio of the core diameter Rc of the core portion 201 to the thickness Rs of the surface layer 202 is preferably 0.2 to 20,000, more preferably 2 to 2,000, still more preferably 10 to 1,000, particularly preferably 20 to 500, and most preferably 30 to 500, and may be 30 to 452, as a ratio represented by Rc/Rs.

The ratio represented by Rc/Rs is preferably 452, 400, 350, 300, 250, 226, 65, 45, or 30, and the upper and lower limits thereof can be appropriately selected from these values.

In a case where Rc/Rs is within the above range, the heat resistance is easily increased, and voids are easily suppressed.

The particle diameter of the second metal powder is 0.2 to 1,000 μm, preferably 1 to 100 μm, and more preferably 5 to 50 μm.

In a case where the particle diameter of the second metal is equal to or more than the lower limit of the above-described preferred range, the wettability is easily ensured, and in a case where the particle diameter of the second metal is equal to or less than the upper limit of the above-described preferred range, an intermetallic compound is more easily formed.

A single type of the second metal powder 20A or two or more types of the second metal powders 20A may be used.

<Relationship Between Content of First Metal Powder and Content of Second Metal Powder>

In the solder paste according to the first embodiment, regarding the mixing ratio of the first metal powder to the second metal powder, the content of the first metal powder is preferably 30% to 99% by mass, more preferably 60% to 95% by mass, still more preferably 70% to 95% by mass, and particularly preferably 80% to 95% by mass relative to the total content (100% by mass) of the first metal powder and the second metal powder.

Regarding the mixing ratio of the first metal powder to the second metal powder, the content of the second metal powder is preferably 1% to 70% by mass, more preferably 5% to 40% by mass, still more preferably 5% to 30% by mass, and particularly preferably 5% to 20% by mass relative to the total content (100% by mass) of the first metal powder and the second metal powder.

In the solder paste according to the first embodiment, the ratio of the content of the first metal powder to the content of the second metal powder is preferably 4, 8, or 9 as a mass ratio represented by content of first metal powder/content of second metal powder, and the upper and lower limits can be appropriately selected from these values.

The mass ratio represented by content of first metal powder/content of second metal powder may be, for example, 1 to 20, 3 to 15, 6 to 10, or 4 to 9.

<Flux>

The solder paste according to the first embodiment contains a flux.

The components contained in the flux are not particularly limited as long as the effects of the present invention are exhibited. Examples of the components include a resin component such as rosin, an activator, a thixotropic agent, a solvent, a metal deactivator, a surfactant, a silane coupling agent, an antioxidant, and a colorant.

Examples of the rosin include natural resins with an abietic acid as a main component, containing a mixture of the abietic acid and its isomer, and resins obtained by chemically modifying the natural resins.

Examples of the activator include an organic acid, an amine, and a halogen compound.

Examples of the thixotropic agent include an ester-based thixotropic agent, an amide-based thixotropic agent, and a sorbitol-based thixotropic agent.

In the solder paste, the flux content is preferably 5% to 30% by mass, and more preferably 8% to 15% by mass relative to the total mass of the solder paste.

The above-described solder paste according to the first embodiment contains the first metal powder, the second metal powder, and the flux. The first metal powder contains Sn. The second metal powder has a core portion formed of an alloy containing Ni and Fe, and a surface layer containing Ni that covers the core portion.

In the solder paste according to the first embodiment, since Sn and an alloy containing Ni and Fe form a high-melting point compound during soldering, it is possible to suppress remelting even in a case where a solder joint is reheated.

In the solder paste according to the first embodiment, the second metal powder has a core portion, and a surface layer containing Ni that covers the core portion. The Ni content in the metal forming the surface layer is 50% by mass or more relative to the total mass of the metal forming the surface layer. The thickness of the surface layer is 0.05 μm or more and less than 1.20 μm.

In the solder paste according to the first embodiment, in a case where the second metal powder has the above-described surface layer, excellent heat resistance is obtained, and it is possible to further suppress the occurrence of voids during solder joining. The reason why the above-described effects are obtained is not clear, but is presumed as follows.

Until a certain period of time passes since the start of reflow, the surface layer of the second metal powder acts to protect the core portion of the second metal powder. Since the Ni contained in the surface layer of the second metal powder has lower reactivity with Sn than an alloy containing Ni and Fe, it is possible to suppress the rapid formation of a compound between Sn and the alloy containing Ni and Fe. As a result, the gasified flux is easily discharged from the solder paste, and thus it is possible to further suppress the occurrence of voids during solder joining.

In a case where the thickness of the surface layer is 0.05 μm or more, it is possible to suppress the rapid formation of a compound between Sn and the alloy containing Ni and Fe, and it is possible to further suppress the occurrence of voids.

The Ni in the surface layer gradually diffuses into the melted Sn while a certain period of time passes since the start of reflow. As the Ni in the surface layer disappears, the alloy containing Ni and Fe, which is a core portion, reacts with Sn, and a high-melting point compound is thus formed.

In a case where the thickness of the surface layer is less than 1.20 μm, Ni in the surface layer is likely to diffuse into the melted Sn. Therefore, a high-melting point compound can be formed, and the heat resistance of a solder joint portion is improved.

In the solder paste according to the first embodiment, the core portion of the second metal powder formed of an alloy containing Ni and Fe and Sn of the first metal powder form a high-melting point compound during reflow, and thus the heat resistance is increased.

The reaction that forms the high-melting point compound is an exothermic reaction. The heating value associated with the first metal powder and the second metal powder contained in the solder paste according to the present embodiment is preferably within the following range.

First, a mixed powder including the first metal powder and the second metal powder to be contained in the target solder paste according to the present embodiment is prepared (hereinafter, the mixed powder is referred to as "target sample").

The mixing ratio (mass ratio) of the first metal powder to the second metal powder in the target sample is set to be the same as the mixing ratio (mass ratio) of the first metal powder to the second metal powder in the target solder paste according to the present embodiment.

A mixed powder that is the same as the target sample, except that the second metal powder is replaced with the metal powder of the core portion of the second metal powder, is prepared (hereinafter, the mixed powder is referred to as "reference sample").

The mixing ratio (mass ratio) of the first metal powder to the metal powder of the core portion of the second metal powder in the reference sample is set to be the same as the mixing ratio (mass ratio) of the first metal powder to the second metal powder in the target solder paste according to the present embodiment.

First, the heating value of the reference sample is measured by differential scanning calorimetry (DSC) according to the following procedure.

In the measurement, the measurement can be performed by putting a sample into an aluminum pan using EXSTAR DSC7020 (manufactured by Hitachi High-Tech Science Corporation) as a measurement device. As for a measurement program, the temperature is set to 100° C. to 350° C. and the rate of temperature increase is set to 5° C./min.

The result of the differential scanning calorimetry is obtained as a DSC curve in which the horizontal axis represents a time t and the vertical axis represents a heat flow (the unit is [W] or $[J][s]^{-1}$). Otherwise, the result is obtained as a DSC curve in which the horizontal axis represents a temperature T and the vertical axis represents a heat flow.

In the obtained DSC curve, the value is significantly negative (that is, significant heat is absorbed) near 235° C. at which the first metal powder containing Sn is melted.

Based on the DSC curve, by integrating the heat flow per unit mass (mg) of the reference sample by time, an integrated value $Q_0'$ (the unit is [J]) per unit mass (mg) of the reference sample from a time $t_0$ to a time t is calculated. Here, the time to is a time at which the temperature of the reference sample reaches 200° C.

A time t at which the integrated value $Q_0'$ of the heat flow of the reference sample is minimum within a range of 200° C. to 350° C. is represented by $t_{in0}$. The time $t_{in0}$ is a time at which the heat generation of the reference sample starts. The heating value from the time $t_{in0}$ to the time t is defined as a heating value of the reference sample (hereinafter, referred to as "reference heating value $Q_0$"). The reference heating value $Q_0$ is a heating value per unit mass (mg) of the reference sample.

The reference heating value $Q_0$ can also be said to be a heating value from a temperature $T_{in0}$ to a temperature T.

Here, a temperature of the reference sample at the time $t_{in0}$ is represented by $T_{in0}$, and a temperature of the reference sample at the time t is represented by T.

$T_{in0}$ is a temperature of the reference sample when the integrated value $Q_0'$ of the heat flow of the reference sample is minimum within a range of 200° C. to 350° C.

Next, a DSC curve is obtained for the target sample by differential scanning calorimetry in the same manner as for the reference sample.

$T_{in}$ of the target sample is calculated in the same manner as $T_{in0}$ of the reference sample. For the target sample, the heating value from a temperature $T_{in}$ to a temperature T is calculated (hereinafter, referred to as "target heating value Q"). The target heating value Q is a heating value per unit mass (mg) of the target sample.

The target heating value Q can also be said to be a heating value from the temperature $T_{in}$ to the temperature T.

Here, a temperature of the target sample at the time $t_{in}$ is represented by $T_{in}$, and a temperature of the target sample at the time t is represented by T.

$T_{in}$ is a temperature of the target sample when the integrated value of the heat flow of the target sample is minimum within a range of 200° C. to 350° C.

Figure 6:
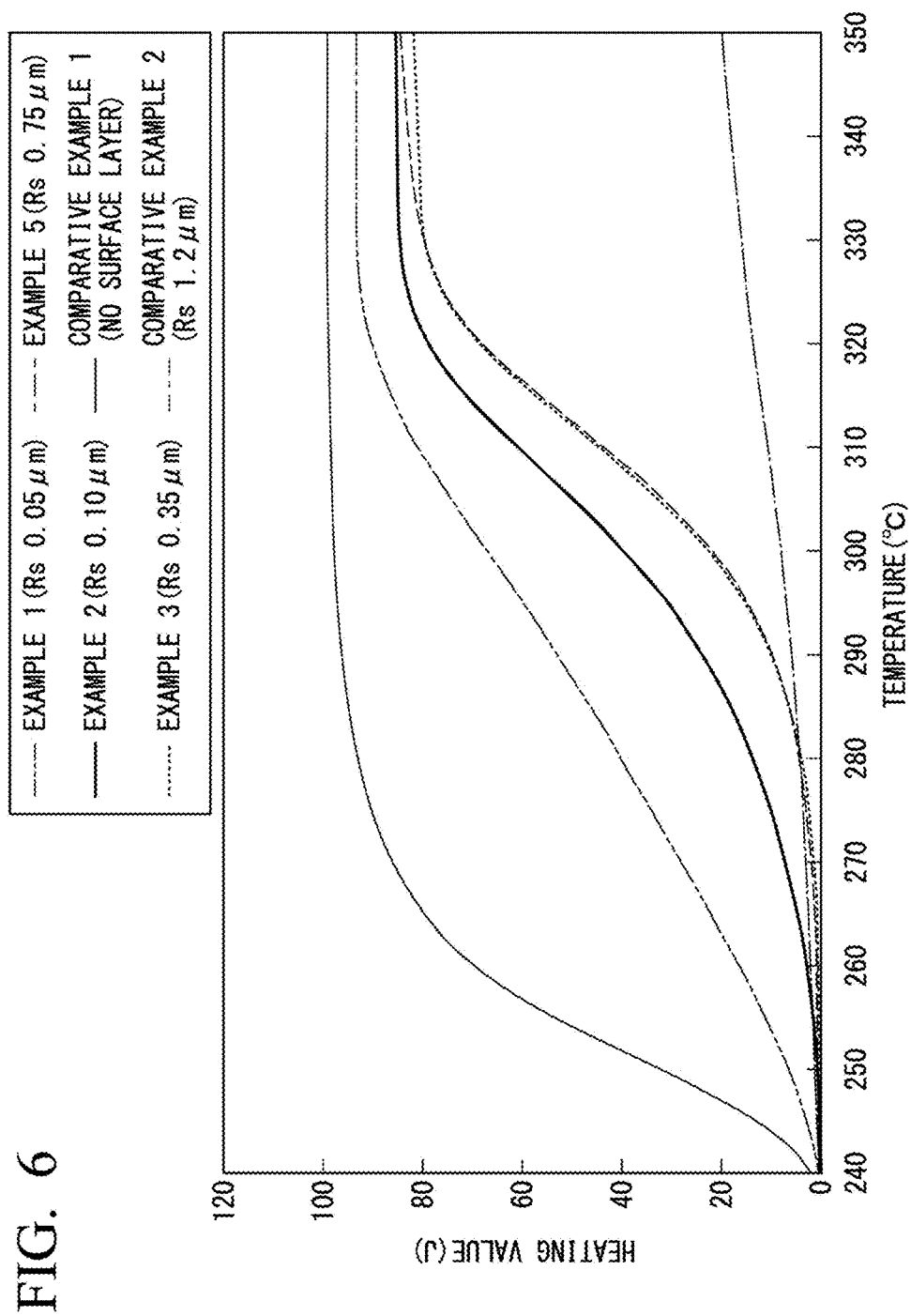
FIG. 6 is a diagram showing heating values of Examples 1 to 3 and 5 and Comparative Examples 1 and 2.

Although described later in Examples, the target heating value Q from the temperature $T_{in}$ to the temperature T is calculated, for example, as shown in FIG. 6. In FIG. 6, the reference heating value $Q_0$ from the temperature $T_{in0}$ to the temperature T is a heating value of Comparative Example 1.

The proportion of the target heating value Q of the target sample within a range of the temperature $T_{in}$ to 300° C. is preferably 10% or more and less than 100% relative to the reference heating value $Q_0$ (100%) of the reference sample within a range of the temperature $T_{in0}$ to 300° C.

The lower limit of the proportion of the target heating value is preferably 10% or more, more preferably 15% or more, still more preferably 20% or more, particularly preferably 25% or more, most preferably 30% or more, and may be 40% or more, 50% or more, or 60% or more.

The upper limit of the proportion of the target heating value is not particularly limited, but may be less than 100%, or equal to or less than 80%.

Figure 7:
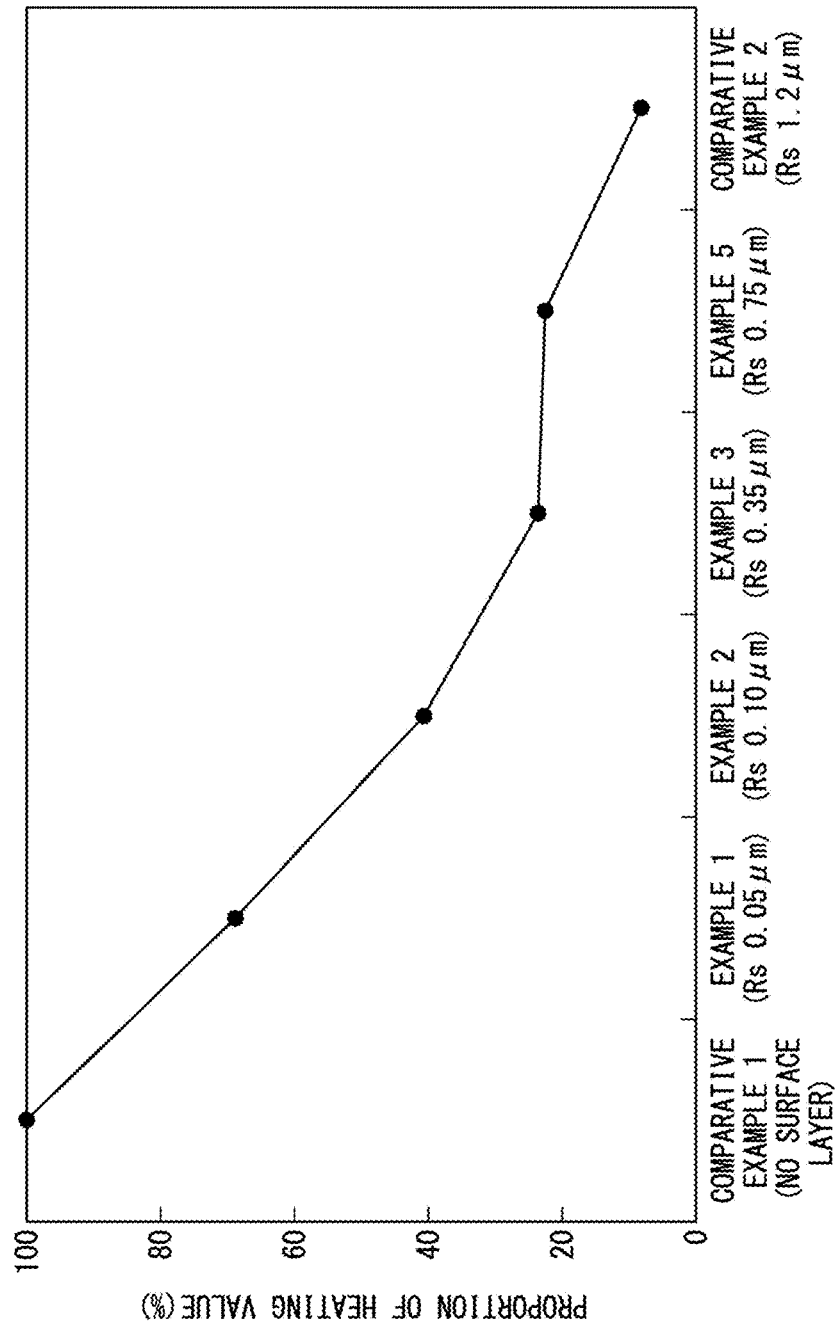
FIG. 7 is a graph showing proportions of the heating values of Examples 1 to 3 and 5 and Comparative Example 2 relative to the heating value of Comparative Example 1.

Although described later in Examples, the proportion of the target heating value Q of the target sample within a range of the temperature Tim to 300° C. relative to the reference heating value $Q_0$ (100%) of the reference sample within a range of the temperature $T_{in0}$ to 300° C. is calculated as shown in FIG. 7, for example.

From the above, in summary, the heating value associated with the first metal powder and the second metal powder is preferably as follows.

In the measurement by differential scanning calorimetry, the proportion of the target heating value Q per unit mass (mg) of the target sample within a range of the temperature $T_{in}$ to 300° C. is preferably 10% or more and less than 100% relative to the reference heating value $Q_0$ (100%) per unit mass (mg) of the reference sample within a range of the temperature $T_{in0}$ to 300° C.

The target sample is a mixed powder including the first metal powder and the second metal powder. The mixing ratio (mass ratio) of the first metal powder to the second metal powder in the target sample is the same as the mixing ratio (mass ratio) of the first metal powder to the second metal powder in the solder paste.

The reference sample is a mixed powder including the first metal powder and the metal powder of the core portion of the second metal powder. The mixing ratio (mass ratio) of the first metal powder to the metal powder of the core portion of the second metal powder in the reference sample is the same as the mixing ratio (mass ratio) of the first metal powder to the second metal powder in the solder paste.

The temperature $T_{in}$ is a temperature of the target sample when the integrated value of the heat flow of the target sample is minimum within a range of 200° C. to the temperature T. The temperature T of the target sample can be a temperature of 200° C. to 350° C.

The temperature $T_{in0}$ is a temperature of the target sample when the integrated value of the heat flow of the reference sample is minimum within a range of 200° C. to the temperature T. The temperature T of the reference sample can be a temperature of 200° C. to 350° C.

In a case where a main component of the surface layer of the second metal powder is Cu, Au, Ag, or Pd instead of Ni, Cu, Au, Ag, and Pd are more likely to diffuse into the melted Sn than Ni. Therefore, the surface layer containing Cu, Au, Ag, or Pd as a main component cannot sufficiently suppress the rapid formation of a compound between Sn and the alloy containing Ni and Fe.

Even in a case where the main component of the surface layer of the second metal powder is Bi instead of Ni, Bi is dissolved in Sn, and thus it is not possible to sufficiently suppress the rapid formation of a compound between Sn and the alloy containing Ni and Fe.

In a case where the main component of the surface layer of the second metal powder is a low-melting point metal such as In instead of Ni, the surface layer is melted in a short time after the start of reflow, and thus it is not possible to sufficiently suppress the rapid formation of a compound between Sn and the alloy containing Ni and Fe.

In addition, Cu, Au, Ag, and Pd are more likely to react with Sn and form a compound than Ni. Therefore, the surface layer containing Cu, Au, Ag, or Pd forms a compound with Sn, the compound inhibits the formation of a high-melting point compound with Sn and the alloy containing Ni and Fe, and as a result, the heat resistance of a solder joint portion is not sufficiently increased.

The embodiment of the present invention is not limited to the first embodiment, and may be another embodiment other than the first embodiment. As another embodiment, second to fourth embodiments will be described.

Second Embodiment

A solder paste according to the second embodiment is obtained by changing the second metal powder 20A to a second metal powder 20B in the solder paste according to the first embodiment.

The solder paste according to the second embodiment is the same as that according to the first, third, or fourth embodiment, except that the second metal powder 20B is contained.

Examples of a core portion 201 and a surface layer 202 in the second metal powder 20B include the same ones as those described above in the second metal powder 20A.

Figure 2:
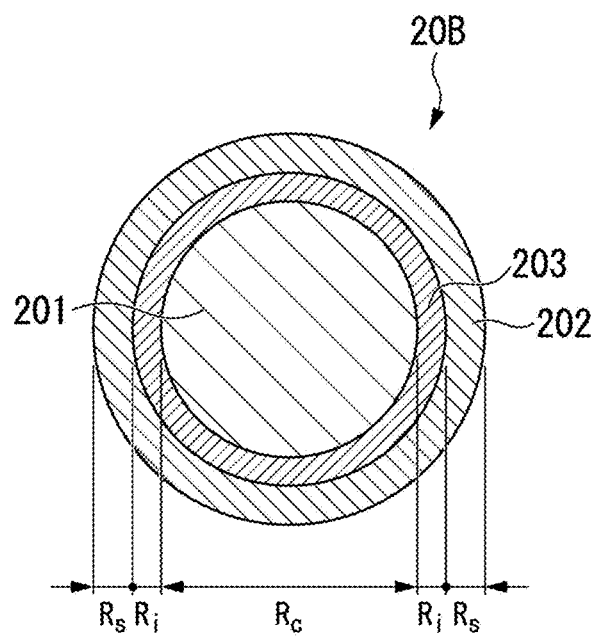
FIG. 2 is a schematic diagram showing a cross section of a second metal powder 20B of a solder paste in a second embodiment.

As illustrated in FIG. 2, the second metal powder 20B has an intermediate layer 203 that covers the core portion 201 between the core portion 201 and the surface layer 202 that covers the core portion 201.

The intermediate layer may cover a part of the surface of the core portion or the whole surface of the core portion, and preferably covers the whole surface of the core portion. In FIG. 2, the intermediate layer 203 covers the whole surface of the core portion 201.

The proportion of the area of the surface of the core portion covered with the intermediate layer is preferably 50% or more and 100% or less, more preferably 70% or more and 100% or less, still more preferably 90% or more and 100% or less, particularly preferably 95% or more and 100% or less, and most preferably 100%, relative to the total surface area (100%) of the core portion.

Ri represents a thickness of the intermediate layer 203.

The intermediate layer may be a single layer or two or more layers.

In the second metal powder 20B illustrated in FIG. 2, the intermediate layer 203 is a single layer.

The metal forming the intermediate layer 203 has a different composition from the metal forming the core portion 201 and the metal forming the surface layer 202.

The metal forming the intermediate layer may be a single simple substance metal or an alloy formed of two or more metal elements.

Examples of the metal that may be contained in the intermediate layer include Ag, Cu, In, Bi, Ni, Ge, P, Co, Ga, Zn, Sb, Pb, Au, Al, Pt, Pd, Fe, Mn, Zr, Sn, and As. These metals may be contained alone, or two or more thereof may be contained. A metal group that may be contained in the intermediate layer can be optionally selected from these metals.

The intermediate layer may contain unavoidable impurities other than the above-described metals. Even in a case where unavoidable impurities are contained, the effects of the present invention are not affected.

A single type of the metal forming the intermediate layer or two or more types of the metals forming the intermediate layer may be used.

The thickness Ri of the intermediate layer may be, for example, 0.01 μm or more and 100 μm or less, 0.05 μm or more and 50 μm or less, or 0.1 μm or more and 10 μm or less.

The intermediate layer may be a plating formed by plating.

Examples of the method for plating include known electroplating and electroless plating.

A single type of the second metal powder 20B or two or more types of the second metal powders 20B may be used.

In a case where the second metal powder 20B has the intermediate layer 203, the surface layer 202 of the second metal powder 20B is easily provided.

Third Embodiment

In a solder paste according to the third embodiment, the surface layer of a second metal powder is covered with a metal layer.

The solder paste according to the third embodiment is the same as that according to the first, second, or fourth embodiment, except that the second metal powder has the metal layer.

Figure 3:
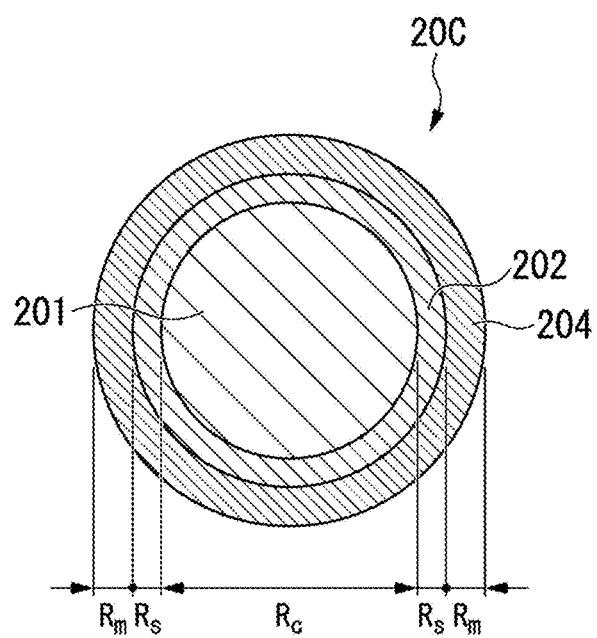
FIG. 3 is a schematic diagram showing a cross section of a second metal powder 20C of a solder paste in a third embodiment.

As illustrated in FIG. 3, a second metal powder 20C has a core portion 201, a surface layer 202 that covers the core portion 201, and a metal layer 204 that covers the surface layer 202.

At least a part of a surface of the surface layer is covered with the metal layer. In FIG. 3, the whole surface of the surface layer 202 is covered with the metal layer 204.

The proportion of the area of the surface of the surface layer covered with the metal layer is preferably 50% or more and 100% or less, more preferably 70% or more and 100% or less, still more preferably 90% or more and 100% or less, particularly preferably 95% or more and 100% or less, and most preferably 100%, relative to the total surface area (100%) of the surface layer.

The metal layer may be a single layer or two or more layers. In the second metal powder 20C illustrated in FIG. 3, the metal layer is a single layer.

The metal forming the metal layer 204 has a different composition from the metal forming the surface layer.

The metal forming the metal layer may be a single simple substance metal or an alloy formed of two or more metal elements.

Examples of the metal that may be contained in the metal layer include Ag, Cu, In, Bi, Ni, Ge, P, Co, Ga, Zn, Sb, Pb, Au, Al, Pt, Pd, Fe, Mn, Zr, Sn, and As. These metals may be contained alone, or two or more thereof may be contained. A metal group that may be contained in the core portion can be optionally selected from these metals.

The metal layer may contain unavoidable impurities other than the above-described metals. Even in a case where unavoidable impurities are contained, the effects of the present invention are not affected.

A single type of the metal forming the metal layer or two or more types of the metals forming the metal layer may be used.

In a case where the metal forming the metal layer contains Fe, the Fe content in the metal forming the metal layer is preferably 0% by mass or more and less than 5% by mass relative to the total mass of the metal forming the metal layer.

A thickness Rm of the metal layer may be, for example, 0.01 μm or more and 100 μm or less, 1 μm or more and 50 μm or less, or 2 μm or more and 10 μm or less.

The metal layer may be a plating formed by plating.

Examples of the method for plating include known electroplating and electroless plating.

In a case where the second metal powder 20C has the metal layer 204, the wettability is improved during melting of the solder paste due to Sn contained in the metal layer, and reduction of voids can also be expected. The metal layer melts after heating begins to melt the solder paste, and the surface layer of the third metal is exposed, which does not impair the effects of the present application.

Fourth Embodiment

A solder paste according to the fourth embodiment further contains a metal powder (hereinafter, also referred to as "third metal powder") other than the first metal powder and the second metal powder.

The solder paste according to the fourth embodiment is the same as that according to the first, second, or fourth embodiment, except that the third metal powder is further contained.

The third metal powder is not particularly limited as long as it has a different composition from the first metal powder and the second metal powder, and for example, a powder formed of a simple substance metal such as Ni, Ag, Cu, In, Bi, Ge, P, Co, Ga, Zn, Sb, Pb, Au, Al, Pt, Pd, Fe, Mn, Zr, Sn, or As, or an alloy formed of two or more elements of these simple substance metals is preferred.

The third metal powder may have, for example: a core portion; and a surface layer that covers the core portion and is formed of a metal containing Ni.

The core portion is not particularly limited as long as it has a different composition from the core portions of the first embodiment and the second embodiment, and for example, a powder formed of a simple substance metal such as Ni, Ag, Cu, In, Bi, Ge, P, Co, Ga, Zn, Sb, Pb, Au, Al, Pt, Pd, Fe, Mn, Zr, Sn, or As, or an alloy formed of two or more elements of these simple substance metals is preferred.

The particle diameter of the third metal powder is preferably 0.1 to 1,000 μm, more preferably 1 to 100 μm, and still more preferably 5 to 50 sm.

The metals constituting the third metal powder may be contained alone, or two or more thereof may be contained.

A single type of the third metal powder or two or more types of the third metal powders may be used.

In a case where the third metal powder is contained, it is possible to increase the thermal conductivity of the solder paste.

(Solder Joint)

A solder joint according to the present invention is formed using the solder paste according to the embodiment.

An object to be joined by the solder joint is not particularly limited. For example, a semiconductor element and a substrate can be joined by the solder joint.

Examples of the semiconductor element include a silicon carbide (SiC) chip and a Si chip.

Examples of the substrate include a circuit board, a ceramic substrate, a metal substrate, and a direct copper bonding (DCB) substrate. The electrode on the substrate may be, for example, a Cu electrode or an electrode obtained by subjecting a Cu electrode to any one of Sn plating, Ni plating, Ni—Au plating, Ni—Pd plating, or Ni—Pd—Au plating.

Examples of the method for joining an object to be joined using the solder paste according to the embodiment include a reflow method. The conditions for reflow can be appropriately set with reference to a known method.

During reflow, the pressure in a reflow furnace may be reduced. By reducing the pressure, the gasified flux is easily discharged from the solder paste, and the occurrence of voids is easily suppressed.

The temperature when a semiconductor element and a substrate are joined is, for example, preferably 120° C. or higher and 400° C. or lower, and may be 200° C. or higher and 400° C. or lower, or 250° C. or higher and 400° C. or lower.

The atmosphere when an object is joined may be an air atmosphere, an inert atmosphere such as a nitrogen atmosphere, or a reducing atmosphere.

As described above, since the solder joint according to the present invention uses the solder paste according to the embodiment containing the first metal powder, the second metal powder, and the flux, the solder joint has excellent heat resistance and an excellent shear strength.

The solder joint according to the present invention is particularly useful in applications requiring a high-temperature solder that does not melt during an operation under high-temperature conditions, such as power semiconductor elements.

EXAMPLES

The present invention will be described below with reference to Examples, but is not limited to the following Examples.

<Preparation of Paste>

Examples 1 to 7 and Comparative Examples 1 and 2

Metal powders each having the composition shown in Table 1 and a flux were mixed to prepare pastes of Examples and Comparative Examples.

In all of the pastes of Examples 1 to 5 and 7, the flux was 12% by mass, and the total mass of the first metal powder and the second metal powder was 88% by mass.

In the paste of Example 6, the flux was 12% by mass, and the total mass of the first metal powder, the second metal powder, and the metal powder C was 88% by mass.

In the paste of Comparative Example 1, the flux was 12% by mass, and the total mass of the first metal powder and the metal powder B was 88% by mass.

In the paste of Comparative Example 2, the flux was 12% by mass, and the total mass of the first metal powder and the metal powder A was 88% by mass.

In the table, a numerical value represents the content of each metal powder relative to the total mass (100% by mass) of the metal powders in the paste. In the table, a blank represents "0".

Regarding a particle diameter of the metal powder and a particle diameter Rc of the core portion, an average particle diameter was measured on a volume basis using a laser diffraction/scattering type particle size distribution measurement device (MT3300EXII) manufactured by Microtrac-BEL Corp.

The melting point of the metal powder was determined by differential scanning calorimetry (DSC). For the first metal powder, DSC7020 manufactured by Hitachi High-Tech Science Corporation was used for measurement, and for the second metal powder and metal powders A to C, DSC404-F3Pegasus manufactured by NETZSCH was used for measurement.

Thicknesses Rs of the surface layers in second metal powders (1) to (5) and metal powders A and C were measured using an Auger electron spectroscopy analyzer based on Auger electron spectroscopy.

First Metal Powder:

A metal powder of 100% by mass of Sn (100% by mass Sn powder)

The first metal powder had a size (particle size distribution) satisfying a symbol 4 in the classification by powder size in Table 2 of JIS Z 3284-1: 2004. That is, in the first metal powder, the content of particles having a particle diameter of 38 μm or less is 99% by mass or more relative to the total mass of the first metal powder. The average particle diameter of the first metal powder was 34.54 μm.

The melting point of the first metal powder was 232° C.

Second Metal Powders (1) to (5):

In the second metal powders (1) to (5), the core portion was a metal powder (Ni-10% by mass Fe powder) formed of an alloy of 90% by mass of Ni and 10% by mass of Fe.

The Ni-10% by mass Fe powder as the core portion had a size (particle size distribution) satisfying a symbol 5 in the classification by powder size in Table 2 of JIS Z 3284-1: 2004. That is, in the Ni-10% by mass Fe powder, the content of particles having a particle diameter of 25 μm or less is 99% by mass or more relative to the total mass of the Ni-10% by mass Fe powder. The particle diameter (that is, core diameter Rc) of the Ni-10% by mass Fe powder as the core portion was 22.59 μm.

The melting point of the core portion was 1,444° C.

In the second metal powders (1) to (5) and the metal powders A and C, the metal forming the surface layer covering the whole surface of the core portion was a metal of 100% by mass of Ni. The surface layer covers the whole core portion with an Ni plating. All these Ni platings were formed by electroplating.

The thicknesses Rs of the surface layers (that is, the thicknesses of the Ni platings) were 0.05 μm in (1), 0.10 μm in (2), 0.35 μm in (3), 0.50 μm in (4), and 0.75 μm in (5).

The melting point of Ni forming the surface layer was 1,455° C.

Metal Powders A to C:

As the metal powder A, a metal powder having: a core portion; and a surface layer that covered the core portion and was formed of Ni was used. The metal powder A was the same as the second metal powder (1), except that the thickness Rs of the surface layer was 1.20 μm.

The particle diameter (that is, core diameter Rc) of the core portion of the metal powder A was 22.59 μm.

The melting point of the core portion was 1,444° C. The melting point of Ni forming the surface layer was 1,455° C.

As the metal powder B, the same metal powder as the metal powder (Ni-10% by mass Fe powder) used as the core portion of each of the second metal powders (1) to (5) was used. The third metal powder was a metal powder having no surface layer.

The particle diameter of the metal powder B was 22.59 μm.

The melting point of the metal powder B was 1,444° C.

As the metal powder C, a metal powder having: a core portion; and a surface layer that covered the core portion and was formed of Ni was used. The surface layer of the metal powder had a thickness of 1 to 3 μm.

The core portion was a metal powder (100% by mass Cu powder) formed of Cu.

The particle diameter (that is, core diameter Rc) of the core portion of the metal powder C was 55.3 μm.

The melting point of the core portion was 1,085° C. The melting point of Ni forming the surface layer was 1,455° C.

SDC5 (manufactured by Senju Metal Industry Co., Ltd.) was used as a flux.

According to the evaluation methods described in <Evaluation> below, <<Evaluation of Void-Suppressing Ability>>, <<Evaluation of Formation of Compound>>, and Evaluation of Heat Resistance>> were performed. The evaluation results are shown in Table 1 and FIG. 8.

Evaluation

<<Evaluation of Void-Suppressing Ability>>

(1) Evaluation Method

The paste of each example was printed on a Cu substrate (size 50 mm×50 mm, thickness 0.3 mm) using a mask (opening portion: size 3 mm×3 mm, thickness 0.15 mm) and a squeegee, a Si chip (size 3 mm×3 mm) was mounted thereon, and then reflow was performed. In the reflow profile, the temperature was increased from 30° C. to the peak temperature (250° C.) at a rate of temperature increase of 3° C./sec. A nitrogen atmosphere was set, and the peak time was set to 2.5 minutes. The pressure was reduced for the first 2 minutes at the peak.

Thereafter, voids were observed using an X-ray observation device.

(2) Determination Criteria

A: A small amount of voids occurred, similar to those in a case where the paste of Comparative Example 2 was used.

B: Voids occurred in a larger amount than in a case where the paste of Comparative Example 2 was used, but occurred in a smaller amount than in a case where the paste of Comparative Example 1 was used.

C: A large amount of voids occurred, similar to those in a case where the paste of Comparative Example 1 was used.

Figure 4:
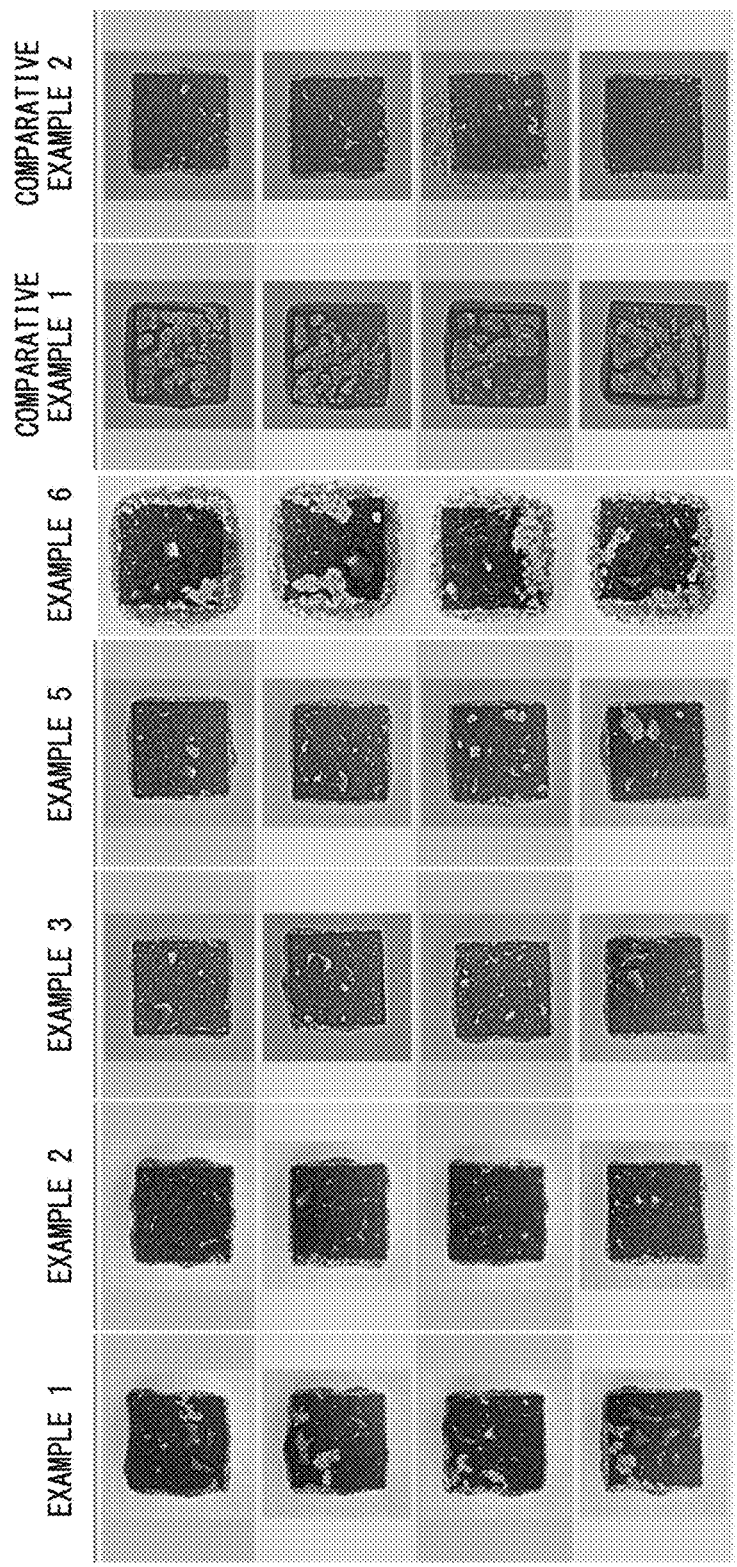
FIG. 4 shows X-ray images for void observation in solder joint portions of Examples 1 to 3, 5, and 6 and Comparative Examples 1 and 2.

FIG. 4 shows X-ray images for observation of Examples 1 to 3, 5, and 6 and Comparative Examples 1 and 2. In Examples 1 to 3, 5, and 6 and Comparative Example 2, it was confirmed that voids were suppressed compared to Comparative Example 1. Although no captured image was shown, in Example 4, voids were suppressed to the same extent as in Examples 3 and 5. Although no captured image was shown, in Example 7, it was confirmed that voids were suppressed compared to Comparative Example 1.

TABLE 1

| Metal Powder | | | | Example 1 | Example 2 | Example 3 | Example 4 | Example 5 | Example 6 | Example 7 | Comparative Example 1 | Comparative Example 2 |
|---|---|---|---|---|---|---|---|---|---|---|---|---|
| First Metal Powder | 100% by Mass Sn Powder Particle Diameter 34.54 μm | | | 90 | 90 | 90 | 90 | 90 | 80 | 80 | 90 | 90 |
| Second Metal Powder (1) | Core Portion Ni-10% by Mass Fe Powder Rc 22.59 μm | Surface Layer Ni 100% Rs 0.05 μm | Rc/Rs 452 | 10 | | | | | | | | |
| Second Metal Powder (2) | Core Portion Ni-10% by Mass Fe Powder Rc 22.59 μm | Surface Layer Ni 100% Rs 0.10 μm | Rc/Rs 226 | | 10 | | | | 10 | 20 | | |
| Second Metal Powder (3) | Core Portion Ni-10% by Mass Fe Powder Rc 22.59 μm | Surface Layer Ni 100% Rs 0.35 μm | Rc/Rs 65 | | | 10 | | | | | | |
| Second Metal Powder (4) | Core Portion Ni-10% by Mass Fe Powder Rc 22.59 μm | Surface Layer Ni 100% Rs 0.50 μm | Rc/Rs 45 | | | | 10 | | | | | |
| Second Metal Powder (5) | Core Portion Ni-10% by Mass Fe Powder Rc 22.59 μm | Surface Layer Ni 100% Rs 0.75 μm | Rc/Rs 30 | | | | | 10 | | | | |
| Metal Powder A | Core Portion Ni-10% by Mass Fe Powder Rc 22.59 μm | Surface Layer Ni 100% Rs 1.20 μm | Rc/Rs 19 | | | | | | | | | 10 |
| Metal Powder B | Ni-10% by Mass Fe Powder Particle Diameter 22.59 μm | | | | | | | | | | 10 | |
| Metal Powder C | Core Portion Cu % by Mass Powder Rc 55.3 μm | Surface Layer Ni 100% Rs 1 to 3 μm | Rc/Rs– | | | | | | | 10 | | |
| Evaluation | Void-Suppressing Ability | | | B | A | A | A | A | B | B | C | A |
| | Heat Resistance | | | A | B | B | B | B | B | B | A | C |

<<Evaluation of Heat Resistance>>

(1) Evaluation Method

Sn and the allow containing Ni and Fe contained in the solder paste form a high-melting point compound, whereby the heat resistance of a solder joint portion is increased. The reaction that forms this compound is an exothermic reaction. Therefore, the heating value during the formation of the compound was measured to evaluate the heat resistance.

First, a mixed powder formed of the metal powder contained in each of the solder pastes of Examples 1 to 3 and 5 and Comparative Examples 1 and 2 was prepared. Hereinafter, these mixed powders are referred to as mixed powders of Examples 1 to 3 and 5 and Comparative Examples 1 and 2. In each mixed powder, the mixing ratio (mass ratio) of each metal powder was set to be the same as the mixing ratio (mass ratio) in the solder paste.

Each mixed powder was put into an aluminum pan, and an exothermic peak was measured by DSC. EXSTAR DSC7020 (manufactured by Hitachi High-Tech Science Corporation) was used as a measurement device. As for a measurement program, the temperature was set to 100° C. to 350° C. and the rate of temperature increase was set to 5° C./min.

Figure 5:
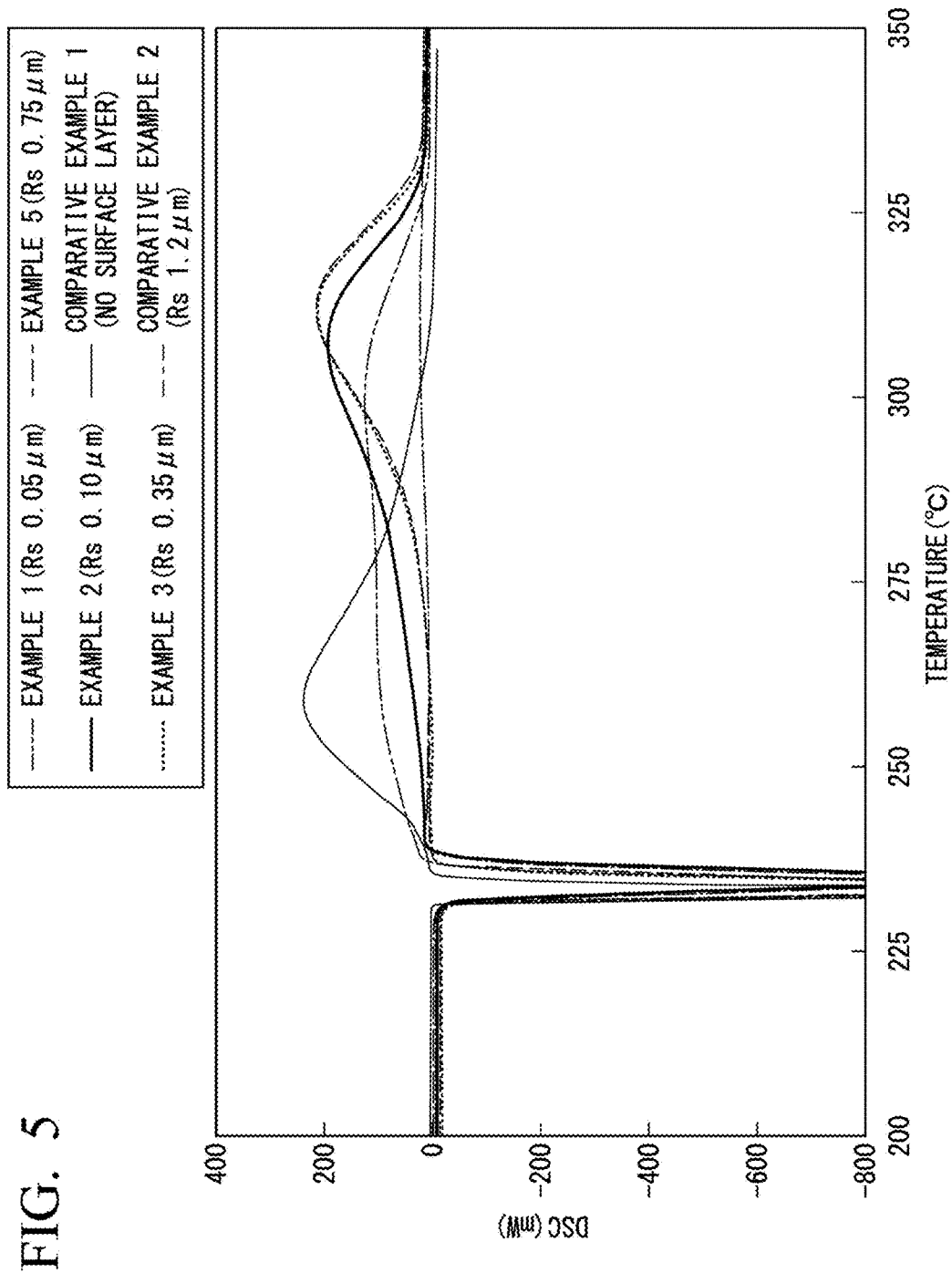
FIG. 5 is a diagram showing DSC curves of Examples 1 to 3 and 5 and Comparative Examples 1 and 2.

FIG. 5 shows measurement results (DSC curves) of the exothermic peaks (heat flows) of the mixed powders of Examples 1 to 3 and 5 and Comparative Examples 1 and 2, per unit mass (mg). In FIG. 5, a large peak near 230° C. indicates an endothermic peak in a case where Sn melts.

Next, based on the DSC curve, by integrating the heat flow per unit mass (mg) by time, an integrated value (the unit is [J]) per unit mass (mg) of each of the mixed powders of Examples 1 to 3 and 5 and Comparative Examples 1 and 2 was calculated.

In the mixed powder of Comparative Example 1, a temperature T at which the heating value was minimum within a range of 200° C. to 350° C. was represented by $T_{in0}$. In each of the mixed powders of Examples 1 to 3 and 5 and Comparative Example 2, a temperature T at which the integrated value was minimum within a range of 200° C. to 350° C. was represented by $T_{in}$.

FIG. 6 shows heating values per unit mass (mg) of the mixed powders of Examples 1 to 3 and 5 and Comparative Example 2 within a range of the temperature $T_{in}$ to 350° C., and a heating value per unit mass (mg) of the mixed powder of Comparative Example 1 within a range of $T_{in0}$ to 350° C.

Next, the proportion of the heating value of each of the mixed powders of Examples 1 to 3 and 5 and Comparative Example 2 within a range of the temperature $T_{in}$ to 300° C. was calculated as a proportion relative to the heating value (100%) of the mixed powder of Comparative Example 1 within a range of the temperature $T_{in0}$ to 300° C. FIG. 7 shows calculation results of the proportions of the heating values. A higher proportion of the heating value means greater progress in the formation of a compound during soldering, resulting in an increase in heat resistance.

From the above, in Examples, it was confirmed that the thicker the thickness of the Ni plating, the later the exothermic reaction starts, and thus the reaction forming a compound was suppressed.

(2) Determination Criteria

A: The proportion of the heating value of the mixed powder was 60% or more relative to the heating value of the mixed powder of Comparative Example 1.

B: The proportion of the heating value of the mixed powder was 20% or more and less than 60% relative to the heating value of the mixed powder of Comparative Example 1.

C: The proportion of the heating value of the mixed powder was less than 20% relative to the heating value of the mixed powder of Comparative Example 1.

It was confirmed that in Examples 1 to 7 and Comparative Example 1, the heat resistance was higher than in Comparative Example 2.

<<Evaluation of Formation of Compound>>

The paste of each example was printed on a substrate in the same manner as in Evaluation of Void-Suppressing Ability>>, and reflow was performed without mounting a Si chip. An image of the solder after reflow was captured.

Figure 8:
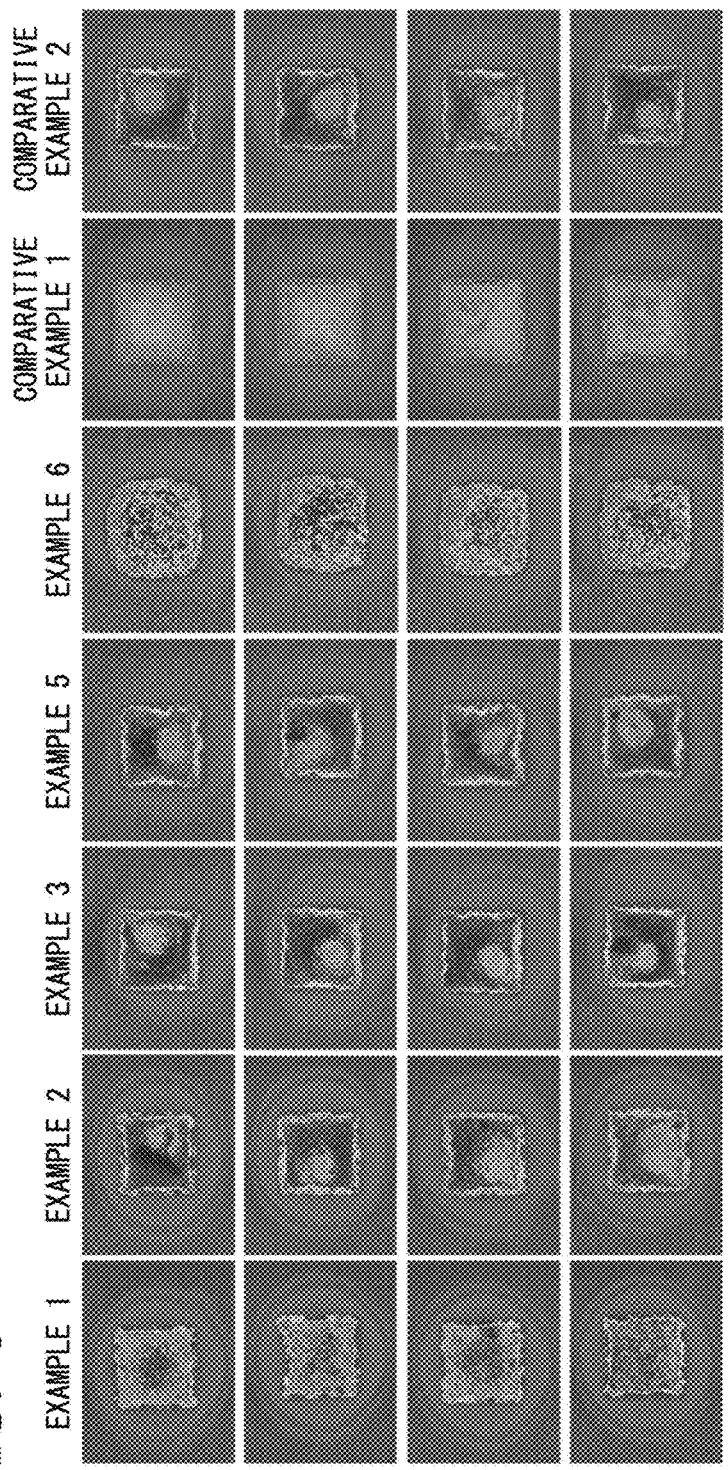
FIG. 8 shows photographs of the formation of a compound after reflow in solder pastes of Examples 1 to 3, 5, and 6 and Comparative Examples 1 and 2.

FIG. 8 shows captured images of Examples 1 to 3, 5, and 6 and Comparative Examples 1 and 2.

In the captured image, the white portion is a portion with a weak metallic luster, and indicates a compound of the alloy containing Ni and Fe and Sn.

In the captured image, the black portion is a portion with a strong metallic luster, and indicates unreacted Sn that has not been subjected to the formation of a compound.

It was confirmed that in Examples 1 to 3, 5, and 6 and Comparative Example 1, the compound was formed in a larger amount than in Comparative Example 2. Although no captured image was shown, in Example 4, the compound was formed to the same extent as in Examples 3 and 5. Although no captured image was shown, in Example 7, the compound was formed in a larger amount than in Comparative Example 2. In Comparative Example 2, the Ni plating was too thick. Thus, it is presumed that the core portion was not completely exposed during joining, and an insufficient amount of the compound was formed to exhibit heat resistance in the core portion and the first metal.

From the results, it was confirmed that in Examples 1 to 7 and Comparative Example 1, the heat resistance was higher than in Comparative Example 2.

While the embodiment of the disclosure has been described in detail with reference to the accompanying drawings, characteristic parts may be enlarged for convenience in these drawings, and dimensional ratios or the like of the components are not limited to those shown in the drawings.

A specific configuration of the embodiment according to the present invention is not limited to the embodiment of the disclosure, and may be changed or substituted without departing from the spirit of the disclosure.

EXPLANATION OF REFERENCES 20A, 20B, 20C: second metal powder
201: core portion
202: surface layer
203: intermediate layer
204: metal layer
Rc: core diameter of core portion
Rs: thickness of surface layer
Ri: thickness of intermediate layer
Rm: thickness of metal layer

What is claimed is:

1. A solder paste comprising:
a first metal powder;
a second metal powder; and
a flux,
wherein the first metal powder contains Sn,
the second metal powder has a core portion formed of an alloy containing Ni and Fe, and a surface layer that covers the core portion and is formed of a metal containing Ni,
an Sn content in the first metal powder is 20% by mass or more and 100% by mass or less relative to a total mass of the first metal powder,
an Ni content in a metal forming the core portion of the second metal powder is 80% by mass or more and 99% by mass or less relative to a total mass of the metal forming the core portion of the second metal powder,
an Fe content in the metal forming the core portion of the second metal powder is 1% by mass or more and 20% by mass or less relative to the total mass of the metal forming the core portion of the second metal powder,
an Ni content in the metal forming the surface layer of the second metal powder is 50% by mass or more relative to a total mass of the metal forming the surface layer of the second metal powder,
a particle diameter of the first metal powder is 0.1 to 1,000 μm,
a particle diameter of the second metal powder is 0.2 to 1,000 μm, and
the surface layer of the second metal powder has a thickness of 0.05 μm or more and 0.30 μm or less.

2. The solder paste according to claim 1,
wherein a content of the first metal powder is 30% to 99% by mass relative to a total mass of the first metal powder and the second metal powder, and
a content of the second metal powder is 1% to 70% by mass relative to the total mass of the first metal powder and the second metal powder.

3. A solder joint formed using the solder paste according to claim 1.

* * * * *